(12) United States Patent
Ogawa

(10) Patent No.: US 11,797,233 B2
(45) Date of Patent: Oct. 24, 2023

(54) DATA RELAY DEVICE, RELAY CONTROL METHOD, AND STORAGE SYSTEM

(71) Applicant: FUJITSU LIMITED, Kawasaki (JP)

(72) Inventor: Junichi Ogawa, Tachikawa (JP)

(73) Assignee: FUJITSU LIMITED, Kawasaki (JP)

( * ) Notice: Subject to any disclaimer, the term of this patent is extended or adjusted under 35 U.S.C. 154(b) by 59 days.

(21) Appl. No.: 17/722,429

(22) Filed: Apr. 18, 2022

(65) Prior Publication Data

US 2023/0028617 A1  Jan. 26, 2023

(30) Foreign Application Priority Data

Jul. 20, 2021  (JP) ................................ 2021-119292

(51) Int. Cl.
  *G06F 3/06* (2006.01)
(52) U.S. Cl.
  CPC .......... *G06F 3/0659* (2013.01); *G06F 3/0604* (2013.01); *G06F 3/0613* (2013.01); *G06F 3/0673* (2013.01)
(58) Field of Classification Search
  CPC .... G06F 3/0659; G06F 3/0604; G06F 3/0613; G06F 3/0673
  See application file for complete search history.

(56) References Cited

U.S. PATENT DOCUMENTS

| | | | |
|---|---|---|---|
| 2004/0133707 A1 | 7/2004 | Yoshiya et al. | |
| 2007/0038830 A1* | 2/2007 | Iwamitsu | G06F 11/0727 |
| | | | 711/167 |
| 2010/0235571 A1 | 9/2010 | Ishii et al. | |
| 2013/0166782 A1 | 6/2013 | Ando | |
| 2016/0147478 A1* | 5/2016 | Katano | G06F 3/0635 |
| | | | 711/154 |
| 2018/0067890 A1* | 3/2018 | Espeseth | G06F 13/24 |
| 2020/0021654 A1* | 1/2020 | Rao | H04L 67/101 |
| 2022/0129193 A1* | 4/2022 | Hill | G06F 3/0608 |
| 2022/0342703 A1* | 10/2022 | Hong | G06F 9/5011 |

FOREIGN PATENT DOCUMENTS

| | | |
|---|---|---|
| JP | 2004-206623 A | 7/2004 |
| JP | 2010-211428 A | 9/2010 |
| JP | 2013-134689 A | 7/2013 |
| WO | 2015/170702 A1 | 11/2015 |
| WO | WO-2022109142 A2 * | 5/2022 ......... G06F 11/0757 |

* cited by examiner

*Primary Examiner* — Edward J Dudek, Jr.
(74) *Attorney, Agent, or Firm* — Fujitsu Patent Center

(57) ABSTRACT

A data relay device including: a storage circuit that stores, for each of storages, an upper limit number indicating a number of input/output (I/O) commands that are transmittable; a relay circuit that relays data transmitted and received between one or more control devices and the storages; and a control circuit that performs: counting, for each storage, a number of commands indicating a number of the I/O commands that have been transmitted via the relay circuit and for which no response has been returned from transmission destination storages among the storages; in response to a request to retry transmission of the I/O commands from one storage among the storages, registering a first number in the storage circuit as the upper limit number of commands that corresponds to the one storage, the first number being a number obtained by subtracting one from a counted value of the number of commands.

5 Claims, 11 Drawing Sheets

FIG. 6

| PORT NUMBER | COMMAND NUMBER | ELAPSED TIME | UPPER LIMIT NUMBER OF COMMANDS |
|---|---|---|---|
| 1 | 1 | x11 | y1 |
| | 2 | x12 | |
| | ... | ... | |
| 2 | 1 | x21 | y2 |
| | 2 | x22 | |
| | ... | ... | |
| ... | ... | ... | ... | ured to store, for each of a plurality of storage devices,
DATA RELAY DEVICE, RELAY CONTROL METHOD, AND STORAGE SYSTEM

CROSS-REFERENCE TO RELATED APPLICATION

This application is based upon and claims the benefit of priority of the prior Japanese Patent Application No. 2021-119292, filed on Jul. 20, 2021, the entire contents of which are incorporated herein by reference.

FIELD

The embodiments discussed herein are related to a data relay device, a relay control method, and a storage system.

BACKGROUND

In a storage system, a storage device commonly includes a command queue that temporarily holds a received input/output (I/O) command until a response is returned. A control device that accesses the storage device is capable of transmitting I/O commands simultaneously (for example, in parallel without waiting for a response) up to the number of entries of the command queue included in the storage device, as an upper limit. By such processing, the I/O performance of the storage device may be improved.

In addition, as examples of the input/output (I/O) control technique in the storage system, there are proposals as follows. For example, a storage system has been proposed in which a controller that accesses a storage device manages a system load and restricts acceptance of an I/O request ordered by a host when the system load exceeds a predetermined threshold value. In addition, a storage device including a command queue that holds access commands to a storage device has also been proposed, in which, based on an analysis result for the access commands held in the command queue, it is verified whether writing to the storage device has to be prohibited, and when writing is to be prohibited, an error response is fed back to an access request from the host.

Japanese Laid-open Patent Publication No. 2004-206623 and International Publication Pamphlet No. WO 2015/170702 are disclosed as related art.

SUMMARY

According to an aspect of the embodiments, there is provided a data relay device including: a storage circuit configured to store, for each of a plurality of storage devices, an upper limit number that indicates a number of input/output (I/O) commands that are transmittable; a relay circuit configured to relay data transmitted and received between one or more control devices and the plurality of storage devices; and a control circuit configured to perform processing, the processing including: counting, for each of the plurality of storage devices, a number of commands that indicates a number of the I/O commands that have been transmitted from any of the one or more control devices to any of the plurality of storage devices via the relay circuit and for which no response has been returned from transmission destination storage devices among the plurality of storage devices; in response to a request to retry transmission of the I/O commands from one storage device among the plurality of storage devices, registering a first number in the storage circuit as the upper limit number of commands that corresponds to the one storage device, the first number being a number obtained by subtracting one from a counted value of the number of commands that corresponds to the one storage device; and in response that the relay circuit receives the I/O commands for the one storage device from one control device among the one or more control devices, determining whether the counted value of the number of commands that corresponds to the one storage device immediately before the reception of the I/O commands has reached the upper limit number of commands that corresponds to the one storage device, and in a case where the counted value of the number of commands that corresponds to the one storage device immediately before the reception of the I/O commands has reached the upper limit number of commands that corresponds to the one storage device, discarding the received I/O commands and requests the one control device to retry transmission of the received I/O command.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating a data configuration example of a command management table;

DESCRIPTION OF EMBODIMENTS

Incidentally, when the maximum number of I/O commands simultaneously transmittable to the storage device by the control device is larger than the number of entries of the command queue included in the storage device, the I/O performance of the entire system is limited to the I/O performance of the storage device or lower. In addition, in such a case, for example, when the I/O commands transmitted from the control device overflow from the command queue, the storage device frequently returns a retry request for command transmission, and in consequence, the behavior of the entire system tends to be unstable. As a result, the I/O performance of the entire system is likely to deteriorate more than the maximum performance of the storage device.

In one aspect, it is an object of the present embodiments to provide a data relay device, a relay control method, and a storage system capable of suppressing a deterioration in the I/O performance due to an excessive number of commands issued.

Hereinafter, embodiments will be described with reference to the drawings.

First Embodiment

Figure 1:
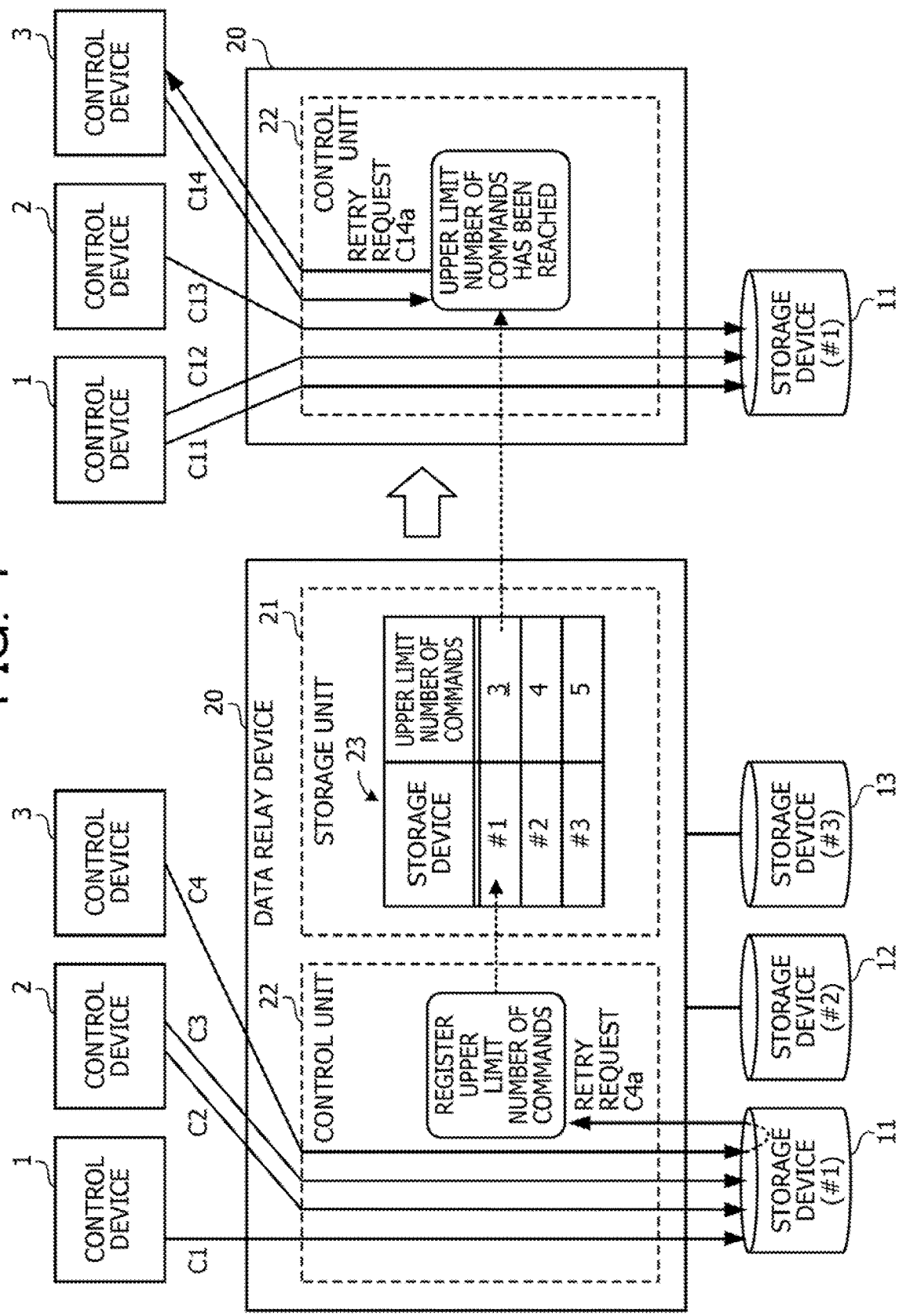
FIG. 1 is a diagram illustrating a configuration example and a processing example of a storage system according to a first embodiment.

FIG. 1 is a diagram illustrating a configuration example and a processing example of a storage system according to a first embodiment. The storage system illustrated in FIG. 1 includes one or more control devices, a plurality of storage devices, and a data relay device 20. In FIG. 1, three control devices 1 to 3 are exemplified as the one or more control devices, and three storage devices 11 (#1), 12 (#2), and 13 (#3) are exemplified as the plurality of storage devices.

The control devices 1 to 3 access the storage devices 11 to 13 via the data relay device 20. Two or more control devices among the control devices 1 to 3 access each of the storage devices 11 to 13 in some cases. The control devices 1 to 3 are, for example, computer devices such as servers or communication interface circuits equipped in the computer devices.

The storage devices 11 to 13 are storage devices to be accessed from the control devices 1 to 3 and are implemented as non-volatile storage devices such as hard disk drives (HDDs) and solid state drives (SSDs), for example. Each of the storage devices 11 to 13 includes a command queue that temporarily holds the received I/O command until a response to the I/O command is returned. The command queue contains a plurality of entries.

The data relay device 20 includes a relay unit (for example, a port multiplexer) (not depicted) and relays data transmitted and received between the control devices 1 to 3 and the storage devices 11 to 13 by the operation of this relay unit. For example, this relay unit transfers the I/O command transmitted from any of the control devices 1 to 3 to a storage device indicated by the destination of the I/O command. For example, the data relay device 20 is implemented as a serial attached SCSI (SAS, SCSI: small computer system interface) expander, a peripheral component interconnect express (PCIe) switch, a fibre channel arbitrated loop (FC-AL) hub, or the like.

This data relay device 20 includes a storage unit 21 and a control unit 22.

The storage unit 21 is implemented as a storage area of a storage device such as a random access memory (RAM). In the storage unit 21, the identification number and the upper limit number of commands of the storage device are registered in association with each other for each of the storage devices 11 to 13. The upper limit number of commands indicates the upper limit number of I/O commands transmittable to the corresponding storage device. In FIG. 1, as an example, the identification number and the upper limit number of commands of each of the storage devices 11 to 13 are registered in management information 23 stored in the storage unit 21.

The control unit 22 is implemented as, for example, a processor or a controller circuit including the processor. The control unit 22 executes processing as follows.

The control unit 22 counts the number of commands indicating the number of I/O commands that have been transmitted from any of the control devices 1 to 3 to any of the storage devices 11 to 13 via the relay unit of the data relay device 20 and for which no response has been returned from a storage device as the transmission destination, for each of the storage devices 11 to 13.

In addition, when requested to retry the transmission of the I/O command from one of the storage devices 11 to 13, the control unit 22 registers a number obtained by subtracting one from the counted value of the number of commands corresponding to the one of the storage devices, in the management information 23 as the upper limit number of commands corresponding to the one of the storage devices.

Furthermore, the control unit 22 refers to the management information 23 when the data relay device 20 receives an I/O command for one of the storage devices 11 to 13 from one of the control devices 1 to 3. Then, when the counted value of the number of commands corresponding to the storage device as the command transmission destination immediately before the reception of the I/O command has reached the upper limit number of commands corresponding to that storage device, the control unit 22 discards the received I/O command. At the same time, the control unit 22 requests the control device as the command transmission source to retry the transmission of the received I/O command.

For example, it is assumed that I/O commands C1 to C4 for the storage device 11 are transmitted in order. It is assumed that the I/O command C1 is transmitted from the control device 1, the I/O commands C2 and C3 are transmitted from the control device 2, and the I/O command C4 is transmitted from the control device 3. When the data relay device 20 receives the I/O commands C1 to C4 and transfers the received I/O commands C1 to C4 to the storage device 11 in order, the counted value by the control unit 22 changes to 1, 2, 3, and 4 in sequence as the count value for the storage device 11. However, it is assumed that the responses to the other I/O commands C1 to C3 have not been returned at the time point when the I/O command C4 is received.

Here, it is assumed that the storage device 11 returns a retry request C4a requesting to retry the command transmission, as a response to the I/O command C4. In this case, the control unit 22 registers the value "3" obtained by subtracting one from the current count value "4" for the storage device 11 in the management information 23 as the upper limit number of commands corresponding to the storage device 11 (#1).

Thereafter, it is assumed that I/O commands C11 to C14 for the storage device 11 are transmitted in order. It is assumed that the I/O commands C11 and C12 are transmitted from the control device 1, the I/O command C13 is transmitted from the control device 2, and the I/O command C14 is transmitted from the control device 3. When the data relay device 20 receives the I/O commands C11 to C13 and transfers the received I/O commands C11 to C13 to the storage device 11 in order, the counted value by the control unit 22 is assumed to change to 1, 2, and 3 in sequence as the count value for the storage device 11.

Then, when the I/O command C14 is received from the control device 3, the control unit 22 refers to the management information 23 to read the upper limit number of commands corresponding to the storage device 11. Since this upper limit number of commands is "3", the counted value "3" immediately before receiving the I/O command C14 has reached the upper limit number of commands as the count value for the storage device 11. In this case, the control unit 22 discards the received I/O command C14 and requests the control device 3 as the command transmission source to retry the transmission of the I/O command C14.

In the above process, the upper limit number of commands registered in the management information 23 indicates an estimated value of the number of entries of the command queue included in the corresponding storage device. Then, when the data relay device 20 receives an I/O command to a certain storage device, in a case where the count value for the certain storage device has reached the upper limit number of commands corresponding to the certain storage device, the transmission of the I/O command to the certain storage device is restricted, and a control device as the transmission source is requested to retry the command transmission.

By such a process of the data relay device 20, the number of I/O commands transmitted to the storage device is managed such that the I/O commands do not overflow from the command queue of that storage device. The storage device no longer receives an excessive number of I/O commands that exceed the number of entries of the command queue, whereby unstable behavior such as frequently requesting to retry the command transmission becomes less likely to appear. Accordingly, a deterioration in the I/O performance caused by the transmission of an excessive number of commands to the storage device may be suppressed.

Second Embodiment

Figure 2:
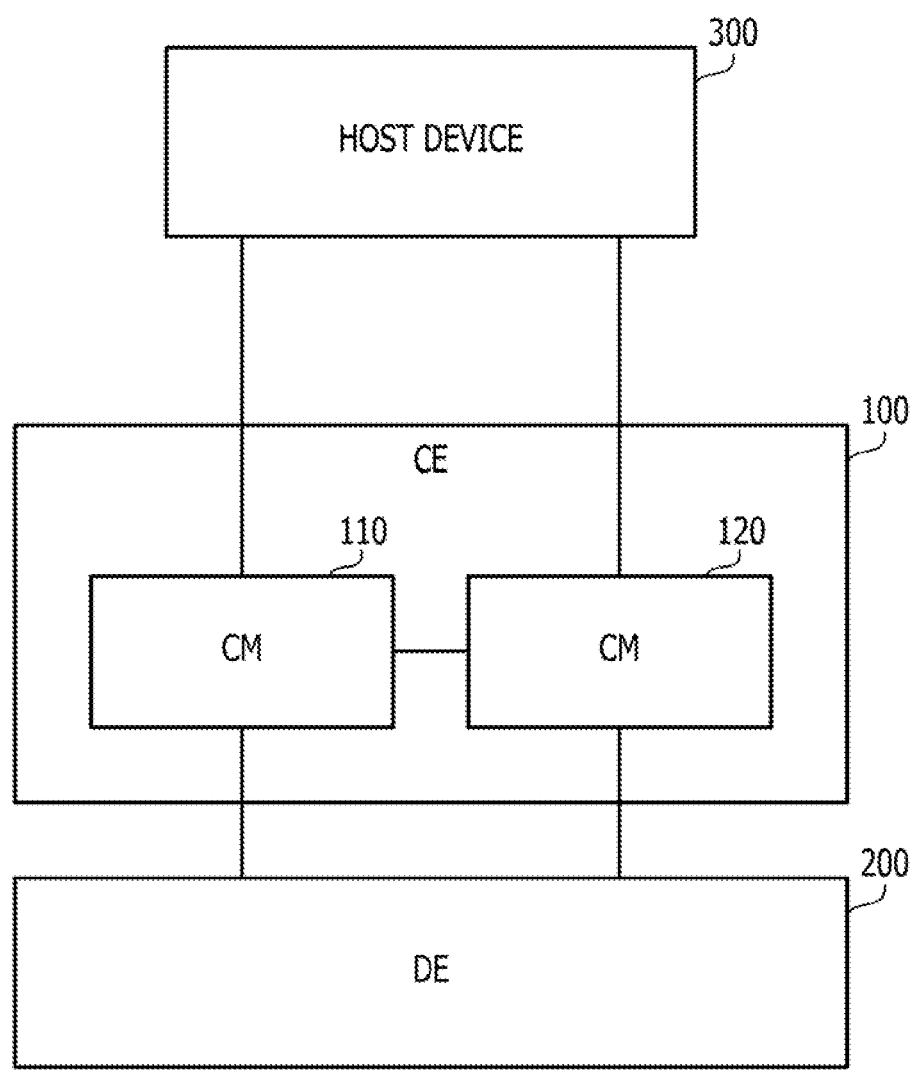
FIG. 2 is a diagram illustrating a configuration example of a storage system according to a second embodiment.

FIG. 2 is a diagram illustrating a configuration example of a storage system according to a second embodiment. The storage system illustrated in FIG. 2 includes a controller enclosure (CE) 100 and a drive enclosure (DE) 200. The CE 100 is equipped with controller modules (CMs) 110 and 120. The DE 200 is equipped with a plurality of HDDs.

A host device 300 is connected to the CMs 110 and 120. The CMs 110 and 120 are storage control devices that access the HDDs equipped in the DE 200 in response to a request from the host device 300. For example, the CMs 110 and 120 set logical volumes using the storage area of the HDD equipped in the DE 200 and accept access to the logical volumes from the host device 300.

Note that the CMs 110 and 120 and the host device 300 are connected via, for example, a storage area network (SAN) using fibre channel, Internet SCSI (iSCSI), or the like. In addition, a plurality of host devices 300 may also be connected to the CMs 110 and 120. Furthermore, the storage device that is included in the DE 200 and to be accessed from the host device 300 is not limited to the HDD and may also be another type of non-volatile storage device such as an SSD.

Figure 3:
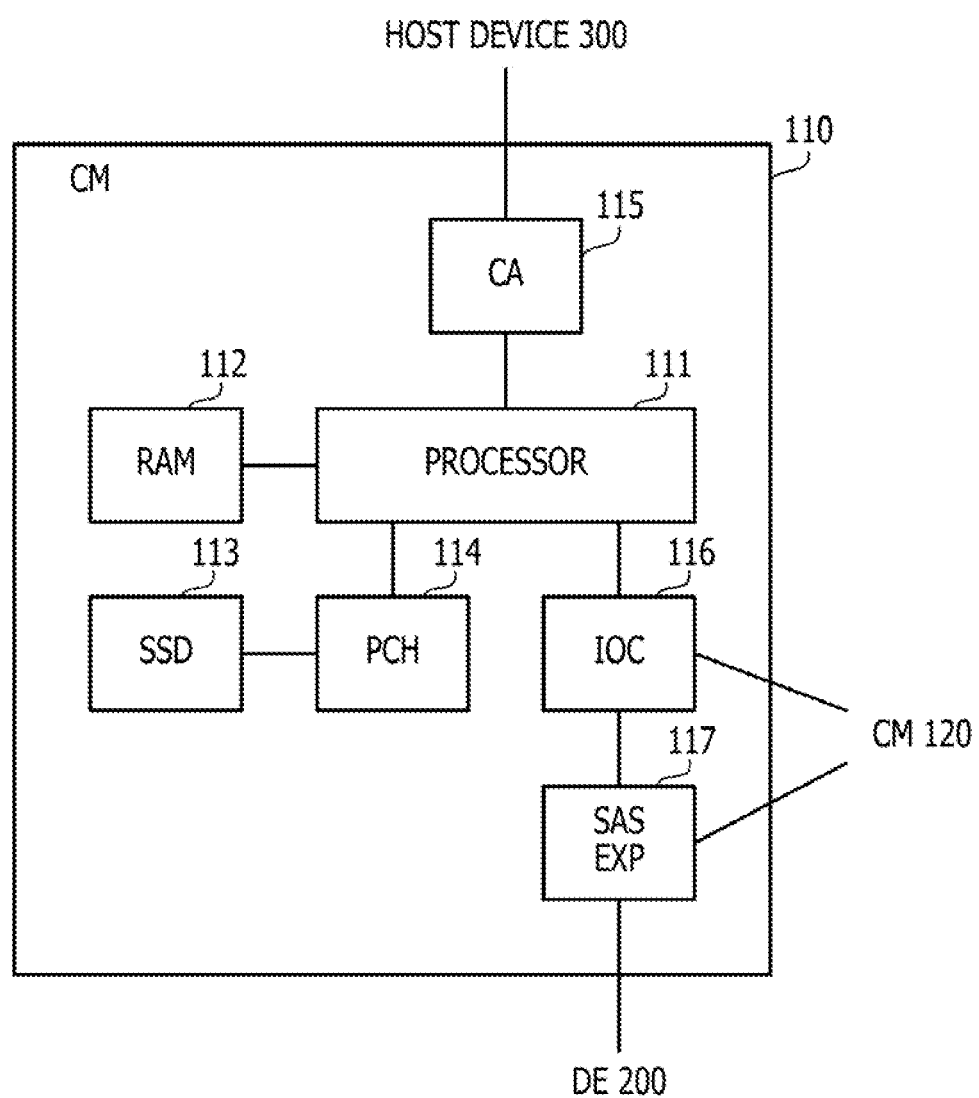
FIG. 3 is a diagram illustrating a hardware configuration example of a controller module (CM)

FIG. 3 is a diagram illustrating a hardware configuration example of the CM. FIG. 3 illustrates a hardware configuration of the CM 110 as an example, but the CM 120 can also be implemented by a hardware configuration similar to the hardware configuration of the CM 110.

The CM 110 includes a processor 111, a RAM 112, an SSD 113, a platform controller hub (PCH) 114, a channel adapter (CA) 115, an input output controller (IOC) 116, and a SAS expander (EXP) 117.

The processor 111 integrally controls the entire CM 110. The processor 111 is any one of, for example, a central processing unit (CPU), a micro processing unit (MPU), a digital signal processor (DSP), an application specific integrated circuit (ASIC), a graphics processing unit (GPU), and a programmable logic device (PLD). In addition, the processor 111 may also be a combination of two or more elements among the CPU, MPU, DSP, ASIC, GPU, and PLD.

The RAM 112 is a main storage device of the CM 110. The RAM 112 temporarily stores at least a part of an operating system (OS) program or an application program to be executed by the processor 111. In addition, the RAM 112 stores various kinds of data used for processing by the processor 111.

The SSD 113 is an auxiliary storage device of the CM 110. The SSD 113 stores the OS program, the application program, and various kinds of data. Note that the CM 110 may also include an HDD instead of the SSD 113 as an auxiliary storage device. The PCH 114 transmits and receives data between the processor 111 and the SSD 113.

The CA 115 is an interface for communicating with the host device 300. The IOC 116 is an interface for transmitting and receiving data between the processor 111 and the HDDs in the DE 200. The IOC 116 is a SAS interface that operates as a SAS initiator. The SAS expander 117 relays data transmitted and received between the IOC 116 and the DE 200. In addition, the IOC 116 and the SAS expander 117 are also connected to the other CM 120, which will be described in detail later.

Figure 4:
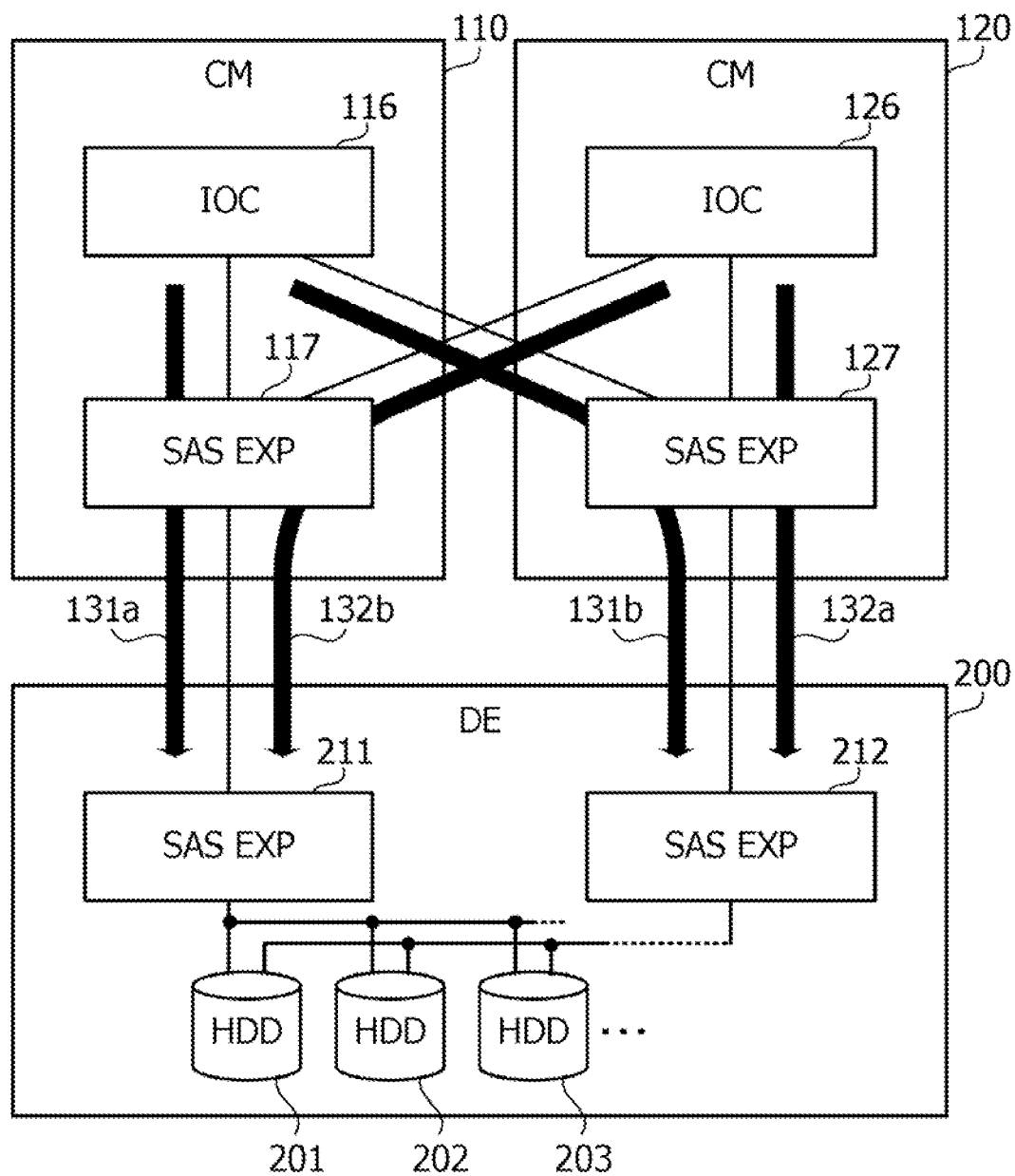
FIG. 4 is a diagram illustrating an internal configuration example of a drive enclosure (DE)

FIG. 4 is a diagram illustrating an internal configuration example of the DE. Note that FIG. 4 also depicts a connection state between the CMs 110 and 120 and the DE 200.

As illustrated in FIG. 4, the DE 200 includes HDDs 201, 202, 203, . . . , and SAS expanders 211 and 212.

The HDDs 201, 202, 203, . . . are examples of the storage devices 11 to 13 illustrated in FIG. 1 and are storage devices to be accessed from the host device 300. Each of the HDDs 201, 202, 203, . . . is connected to both of the SAS expanders 211 and 212. The SAS expander 211 relays data transmitted and received between the SAS expander 117 of the CM 110 and the HDDs 201, 202, 203, . . . . Meanwhile, the SAS expander 212 relays data transmitted and received between a SAS expander 127 of the CM 120 and the HDDs 201, 202, 203, . . . .

Next, the access route from the IOC to the HDDs in the DE 200 will be described with reference to FIG. 4.

Two courses are prepared for access routes between the IOC 116 of the CM 110 and each HDD in the DE 200. For example, the access routes from the IOC 116 to the HDDs 201, 202, 203, . . . of the DE 200 include a route by way of the SAS expanders 117 and 211 and a route by way of the SAS expanders 127 and 212.

Similarly, two course are prepared also for access routes between an IOC 126 of the CM 120 and each HDD in the DE 200. For example, the access routes from the IOC 126 to the HDDs 201, 202, 203, . . . of the DE 200 include a route by way of the SAS expanders 127 and 212 and a route by way of the SAS expanders 117 and 211.

In this manner, the access routes from the IOCs 116 and 126 to each HDD are made redundant. This allows the IOCs 116 and 126 to try to access the HDD using one access route when the HDD is not accessible using the other access route.

In the present embodiment, among the access routes from the IOC 116 to each HDD, the route by way of the SAS expander 117 is assumed to be the access route regularly used. In addition, the route by way of the SAS expander 127 is assumed to be an access route that is used as a substitute when the route by way of the SAS expander 117 is not usable.

Incidentally, the performance of the IOC that issues the I/O commands to the storage devices is being accelerated, and in consequence, the number of entries of the command queue that temporarily holds the I/O commands received by the storage device is also increasing. The larger the number of entries of the command queue included in the storage device, the more I/O commands the IOC is allowed to transmit without waiting for responses to the transmitted I/O commands. As a result, the number of I/O commands processed within a specific period of time increases, and the I/O performance of the entire system improves.

However, since there are a variety of combinations of IOCs and storage devices in actual products, in some cases, the balance between the performance of the IOC and the number of entries of the command queue included in the storage device becomes unbalanced, which sometimes leads to a deterioration in the I/O performance. For example, even when the IOC has high performance and the IOC is capable of transmitting many commands in a short time, if the number of entries of the command queue included in the storage device is small, the I/O performance of the entire system will be kept at the maximum performance or lower on the storage device side. On the contrary, unstable behavior such as frequent transmission of retry requests for command transmission from the storage device tends to occur, and as a result, the I/O performance of the entire system is likely to deteriorate more than the maximum performance on the storage device side.

Here, when the I/O commands are transmitted to the storage device only from a single IOC, the IOC can estimate the maximum number of commands simultaneously transmittable to the storage device, based on, for example, the number of transmitted commands and the response time. The "maximum number of commands simultaneously transmittable" mentioned here refers to the maximum number of I/O commands transmittable to the storage device without waiting for a response, which usually indicates the number of entries of the command queue included in the storage device. If such estimation is possible, the IOC can properly manage the number of commands transmitted such that the I/O performance does not deteriorate.

However, in the present embodiment, the I/O commands are transmitted from a plurality of IOCs (IOCs 116 and 126) to individual storage devices (HDDs) in the DE 200. In the case of such a configuration, each IOC is not allowed to estimate the maximum number of commands simultaneously transmittable to each storage device, with the above method. For this reason, it is difficult for the IOCs to manage the number of commands transmitted such that the I/O performance does not deteriorate.

In addition, for example, when the maximum number of commands simultaneously transmittable to a storage device is set in the IOC with a fixed value, the maximum number of commands may not be expanded even if another storage device that has a larger number of entries of the command queue than that storage device is connected to the set IOC in the future. For this reason, a storage device having a large number of entries of the command queue will not be allowed to demonstrate the maximum performance.

Thus, in the present embodiment, a relay device (SAS expander) located between a plurality of IOCs and each storage device is equipped with a function of estimating the maximum number of commands simultaneously transmittable for each storage device. Based on this estimation result for the maximum number of commands, the relay device determines whether or not the I/O command transmitted from the IOC is permitted to be transferred such that the I/O commands do not overflow from the command queue of the storage device. This suppresses a deterioration in I/O performance due to the transmission of an excessive number of commands to the storage device.

In the present embodiment, it is assumed that this estimation function for the maximum number of commands is equipped in the SAS expanders 211 and 212 in the DE 200. Note that, in this case, the SAS expanders 211 and 212 are examples of the data relay device 20 illustrated in FIG. 1, and the IOCs 116 and 126 are examples of the control devices 1 to 3 illustrated in FIG. 1.

Figure 5:
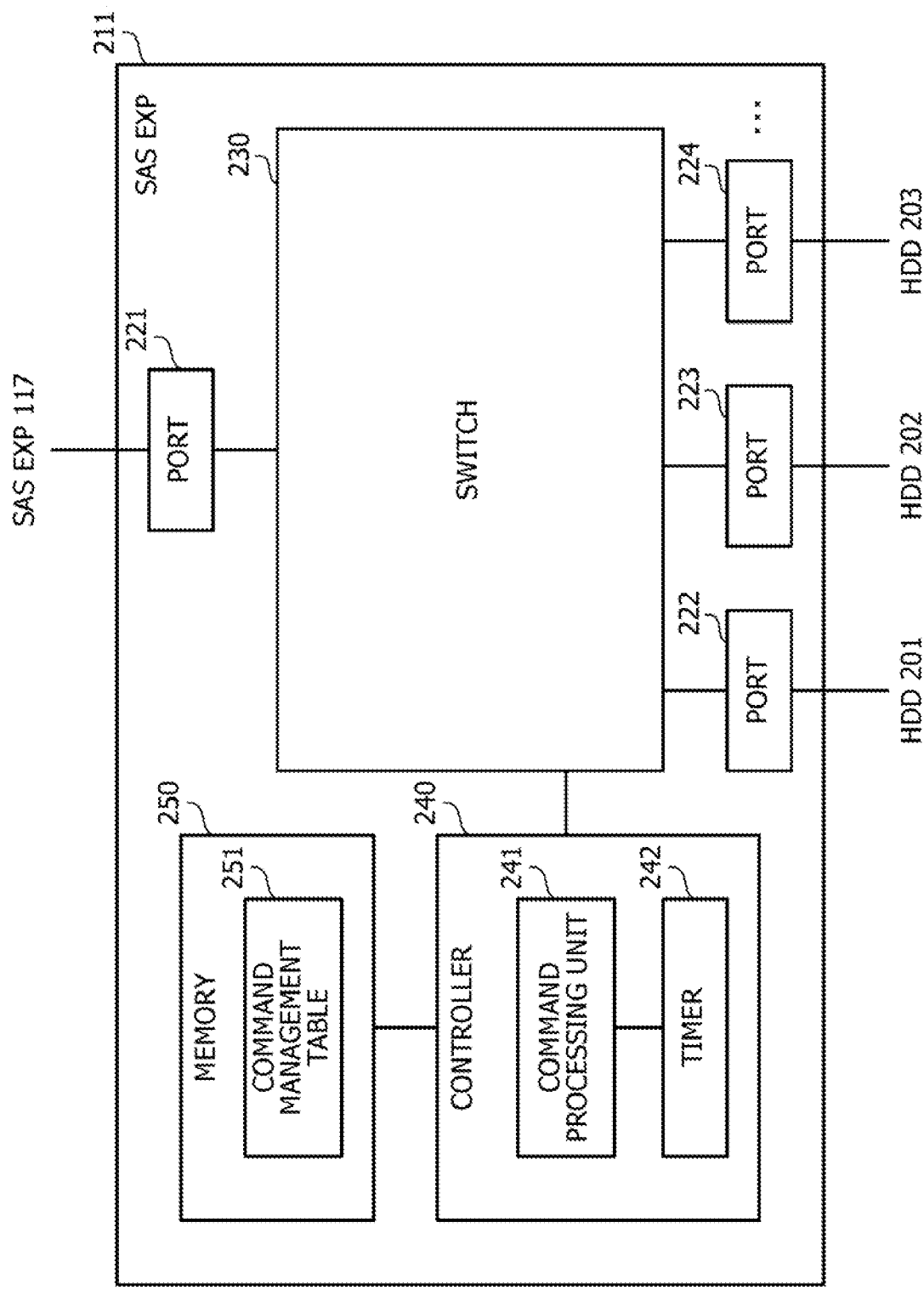
FIG. 5 is a diagram illustrating an internal configuration example of a serial attached small computer system interface (SAS) expander in the DE.

FIG. 5 is a diagram illustrating an internal configuration example of the SAS expander in the DE. FIG. 5 illustrates an internal configuration of the SAS expander 211 as an example, but the SAS expander 212 also has an internal configuration similar to the internal configuration of the SAS expander 211.

The SAS expander 211 includes ports 221, 222, 223, 224, . . . , a switch 230, a controller 240, and a memory 250 as hardware.

The ports 221, 222, 223, 224, . . . are communication ports that transmit and receive data to and from external devices. In the present embodiment, as an example, it is assumed that the port 221 is connected to the SAS expander 117 of the CM 110, and the ports 222, 223, and 224 are connected to the HDDs 201, 202, and 203 in the DE 200, respectively.

Under the control of the controller 240, the switch 230 switches the connection between the ports and relays the data transmitted and received between the ports. Note that the switch 230 is an example of a relay unit (not depicted) included in the data relay device 20 illustrated in FIG. 1.

The controller 240 is an example of the control unit 22 illustrated in FIG. 1 and is, for example, a control circuit including a processor. The controller 240 controls the connection switching operation of the switch 230. In addition, the controller 240 is also capable of restricting the transfer of the I/O command received from the IOC and responding to the I/O command.

The memory 250 is an example of the storage unit 21 illustrated in FIG. 1 and is implemented as, for example, a RAM or a flash memory. The memory 250 stores various kinds of data used in processing of the controller 240. For example, a command management table 251 is stored in the memory 250.

FIG. 6 is a diagram illustrating a data configuration example of the command management table. As illustrated in FIG. 6, the command management table 251 includes respective items of a port number, a command number, an elapsed time, and an upper limit number of commands.

The port number indicates the identification number of a port connected to the HDDs 201, 202, 203, or . . . among the ports 221, 222, 223, 224, . . . included in the SAS expander 211. In association with each port number, one upper limit number of commands is registered, and one or more command numbers are registered. Furthermore, one elapsed time is registered in association with each command number.

The command number indicates the identification number of an I/O command that has been transmitted to the HDD connected to the corresponding port and for which no response has been returned. When a relevant I/O command occurs, a record containing the command number and the elapsed time is registered in the command management table 251. Note that it can also be said that the item of the command number associated with one port operates as a command queue corresponding to that port.

The elapsed time indicates the elapsed time since the corresponding I/O command was transmitted to the HDD. In the item of the elapsed time, "0" is registered as an initial value, and the registered value is increased as time elapses.

The upper limit number of commands indicates the upper limit number of I/O commands simultaneously transmittable to the HDD connected to the corresponding port.

Next, a processing function that the SAS expander 211 has will be described with reference to FIG. 5. The SAS expander 211 includes a command processing unit 241 and a timer 242. The command processing unit 241 and the timer 242 are implemented by the controller 240.

The command processing unit 241 counts the number of I/O commands (incomplete commands) for which no response has been returned among I/O commands that have been transferred to the HDDs, for each HDD. This counted value is indicated by the number of command numbers associated with a port connected to the relevant HDD in the command management table 251. For any of the incomplete commands transmitted to a certain HDD, when requested to retry the command transmission at least from the certain HDD, the command processing unit 241 designates the upper limit number of commands, based on the number of incomplete commands in the certain HDD and registers the designated upper limit number of commands in the command management table 251.

After that, the command processing unit 241 manages the number of I/O commands to be transferred to the HDD such that the number of incomplete commands for that HDD does not exceed the upper limit number of commands. Then, the command processing unit 241 discards an I/O command received from the IOC in excess of the upper limit number of commands and requests the IOC to retry the command transmission.

The timer 242 measures the elapsed time from the time of transfer for each of the I/O commands transferred to the HDDs and registers the measured elapsed time in the command management table 251. In addition to the retry request from the HDD as described above, the command processing unit 241 is also capable of designating the upper limit number of commands according to the elapsed time.

Figure 7:
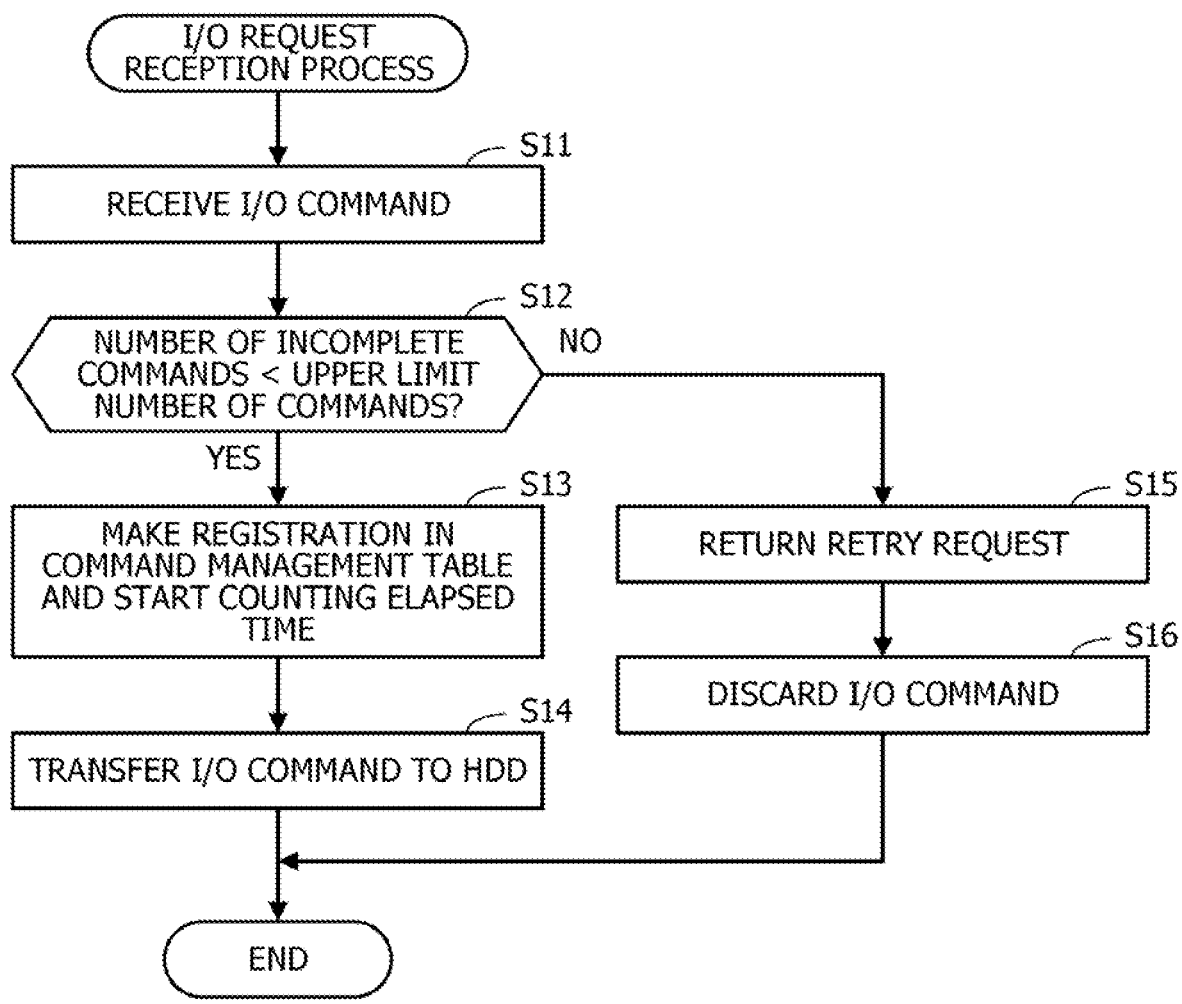
FIG. 7 is an example of a flowchart illustrating a procedure of an I/O request reception process.

FIG. 7 is an example of a flowchart illustrating a procedure of an I/O request reception process.

[Step S11] When the port 221 of the SAS expander 211 receives an I/O command transmitted from any of the IOCs, the command processing unit 241 starts the processes in step S12 and the subsequent steps. Note that the I/O command is a command for requesting I/O processing (write processing or read processing) from any HDD.

[Step S12] The command processing unit 241 refers to the command management table 251 to count the number of incomplete commands for a destination HDD for the I/O command and reads the upper limit number of commands associated with the same destination HDD. The number of incomplete commands is counted as the number of command numbers registered in association with the port connected to the destination HDD in the command management table 251. As the upper limit number of commands, the upper limit number of commands registered in association with this port is read.

The command processing unit 241 determines whether the number of incomplete commands is smaller than the upper limit number of commands. When the number of incomplete commands is smaller than the upper limit number of commands, the process proceeds to step S13, and when the number of incomplete commands has reached the upper limit number of commands, the process proceeds to step S15.

[Step S13] The command processing unit 241 newly registers the command number indicating the received I/O command in the command management table 251 in association with the port connected to the destination HDD. In addition, the command processing unit 241 registers the initial value "0" as the elapsed time corresponding to the registered command number and causes the timer 242 to start counting the elapsed time. After that, the timer 242 increases the registered value of the elapsed time at each specific interval.

[Step S14] The command processing unit 241 controls the switch 230 to transfer the received I/O command to the destination HDD via the port to which the destination HDD is connected.

[Step S15] The command processing unit 241 controls the switch 230 to return a retry request requesting the transmission source IOC of the received I/O command to retry the transmission of the received I/O command.

[Step S16] The command processing unit 241 discards the received I/O command.

According to the above process, when the number of incomplete commands has not reached the upper limit number of commands corresponding to the destination HDD at the time of receiving the I/O command, the received I/O command is transferred to the destination HDD. At the same time, the received I/O command is registered in the command management table 251 and is targeted for counting as an incomplete command.

On the other hand, when the number of incomplete commands has reached the upper limit number of commands corresponding to the destination HDD at the time of receiving the I/O command, the received I/O command is discarded, and the transmission source IOC is requested to retry the command transmission. By discarding the I/O command, the number of incomplete commands is controlled so as not to exceed the predicted value of the number of entries (which is the upper limit number of commands) of the command queue included in the destination HDD.

Figure 8:
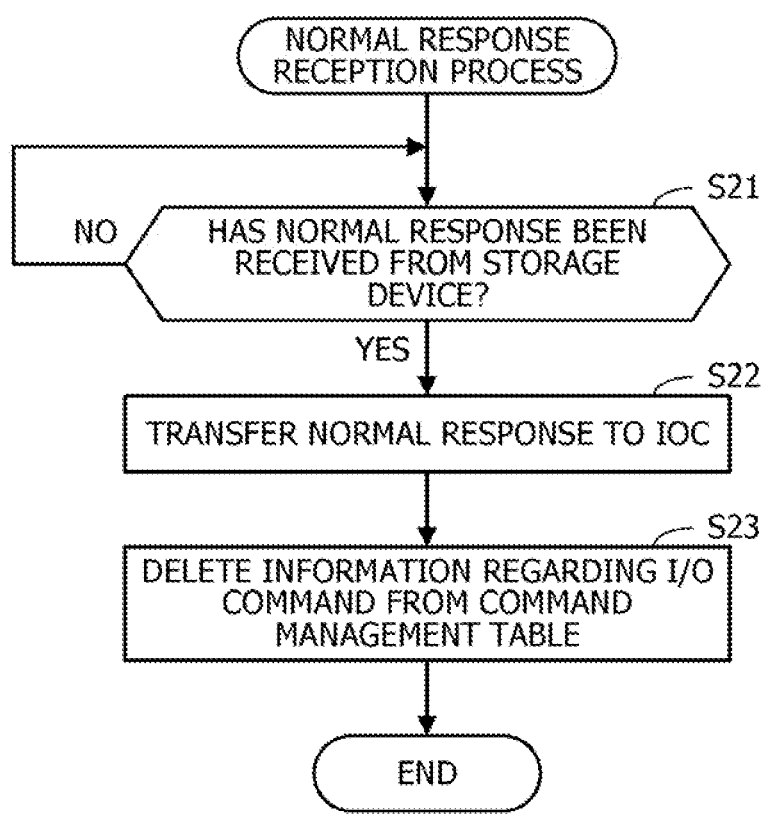
FIG. 8 is an example of a flowchart illustrating a procedure of a normal response reception process.

FIG. 8 is an example of a flowchart illustrating a procedure of a normal response reception process.

[Step S21] The command processing unit 241 monitors that the port connected to the HDD receives a normal response indicating that I/O processing according to the transmitted I/O command has been executed normally. For example, when writing of data is requested by the I/O command, the normal response indicates that the writing has completed normally. In addition, when reading of data is requested by the I/O command, the normal response is response information for returning the data for which reading is requested. When the reception of the normal response is detected, the process proceeds to step S22.

[Step S22] The command processing unit 241 controls the switch 230 to transfer the received normal response to the transmission destination IOC (the transmission source IOC of the corresponding I/O command).

[Step S23] The command processing unit 241 deletes information (the command number and the elapsed time) regarding the I/O command corresponding to the received normal response, from the command management table 251.

Figure 9:
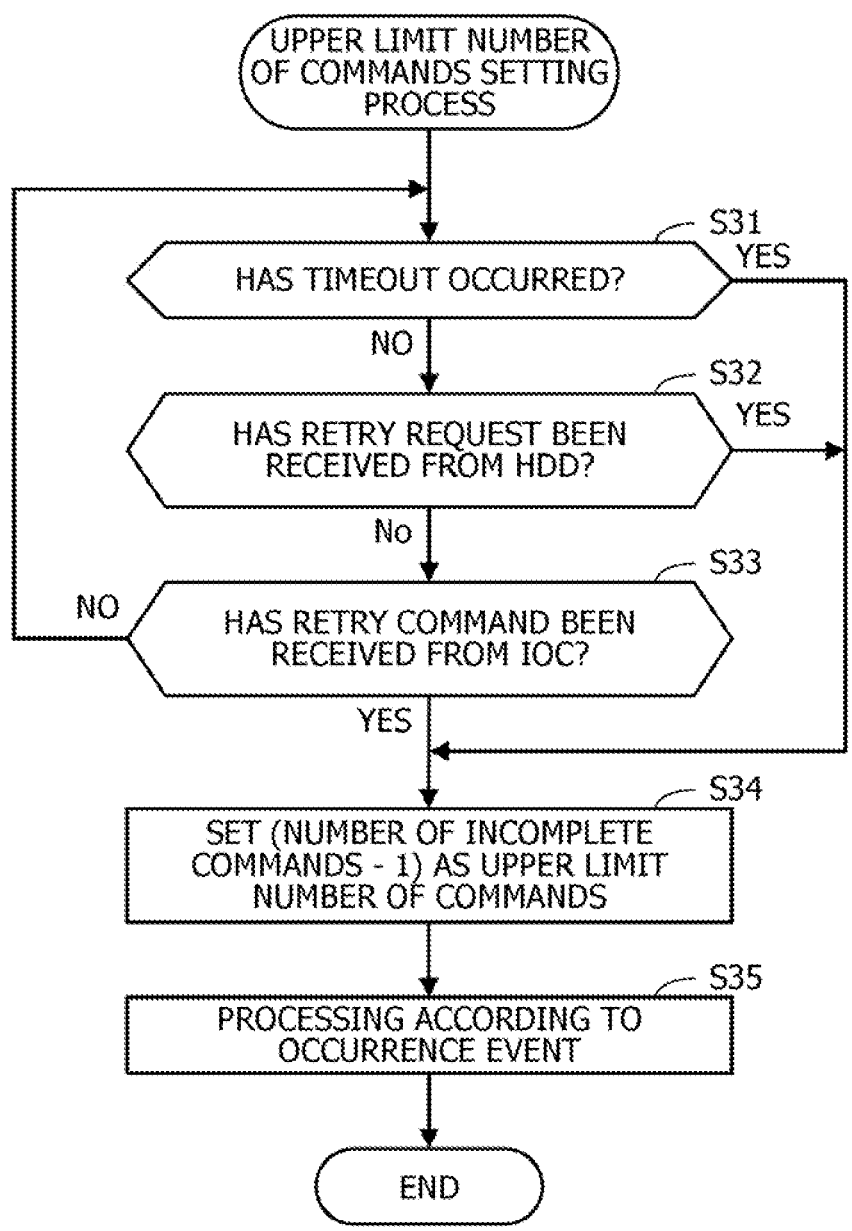
FIG. 9 is an example of a flowchart illustrating a processing procedure for setting an upper limit number of commands.

FIG. 9 is an example of a flowchart illustrating a processing procedure for setting the upper limit number of commands.

[Step S31] The timer 242 monitors whether or not the elapsed time has reached a predetermined threshold value for each of the incomplete commands registered in the command management table 251. When the elapsed time reaches the threshold value, it is determined that a timeout has occurred for the corresponding incomplete command.

The command processing unit 241 determines whether a timeout has occurred for the incomplete commands. When a timeout has occurred for any of the incomplete commands, the process proceeds to step S34, and when no timeout has occurred for all the incomplete commands, the process proceeds to step S32.

[Step S32] The command processing unit 241 determines whether any of the ports connected to the HDDs has received a retry request for command transmission from an HDD. The case where it is determined that the retry request has been received is, for example, a case where an error response to the transmitted I/O command is received and information requesting to retry the command transmission is appended to the received error response. When a retry request is received, the process proceeds to step S34, and when no retry request is received, the process proceeds to step S33.

[Step S33] The command processing unit 241 determines whether the port 221 has received a retry command that retries the transmission of the I/O command, from the IOC. When the retry command is received, the process proceeds to step S34. On the other hand, when the retry command has not been received, the process proceeds to step S31, and the determination process in steps S31 to S33 is executed again.

[Step S34] The command processing unit 241 specifies the HDD for which the upper limit number of commands is to be set. When it is determined to be Yes in step S31, the HDD to be set is the transmission destination HDD of the I/O command for which the timeout has occurred. When it is determined to be Yes in step S32, the HDD to be set is the transmission source HDD of the retry request. When it is determined to be Yes in step S33, the HDD to be set is the transmission destination HDD of the retry command.

The command processing unit 241 refers to the command management table 251 and counts the number of incomplete commands for the specified HDD. The number of incomplete commands is counted as the number of command numbers registered in association with the port connected to the relevant HDD in the command management table 251.

The command processing unit 241 sets the value obtained by subtracting "1" from the counted number of incomplete commands, by overwriting in the item of the upper limit number of commands associated with the port connected to the relevant HDD in the command management table 251.

[Step S35] The command processing unit 241 executes processing according to the occurrence event in steps S31 to S33.

When it is determined to be Yes in step S31, the command processing unit 241 controls the switch 230 to return an error response indicating that an error has occurred, to the IOC as the command transmission source, as response information to the I/O command in which the timeout has occurred. Information indicating that a timeout has occurred may also be appended to this error response. In addition, the command processing unit 241 deletes information (the command number and the elapsed time) regarding the I/O command for which a timeout has occurred, from the command management table 251.

When it is determined to be Yes in step S32, the switch 230 is controlled to retransmit the I/O command requested to be retried, to the transmission source HDD of the retry request. In addition, the command processing unit 241 resets the elapsed time associated with this I/O command to "0" in the command management table 251.

If it is determined to be Yes in step S33, the command processing unit 241 executes the processes in steps S12 to S16 in FIG. 7 by replacing the I/O command in the process in FIG. 7 with the retry command from the IOC.

In the process in FIG. 9 above, when it is determined to be Yes in step S32, a situation is estimated to have occurred in which the received I/O command overflows from the command queue in the transmission source HDD of the retry request. Therefore, it is estimated that the number of incomplete commands that have already been transmitted to this HDD matches the number of entries of the command queue included in the HDD. Accordingly, the number of incomplete commands at the time point when it is determined to be Yes in step S32 is designated as the upper limit number of commands corresponding to this HDD.

In addition, when it is determined to be Yes in steps S31 and S33, it is estimated that a response delay has occurred in the relevant HDD. Therefore, it is estimated that the number of incomplete commands that have already been transmitted to this HDD is highly likely to match the number of entries of the command queue included in the HDD. Accordingly, the number of incomplete commands at the time point when it is determined to be Yes in steps S31 and S33 is designated as the upper limit number of commands corresponding to this HDD.

Next, a processing example of the storage system will be described with reference to a sequence diagram.

Figure 10:
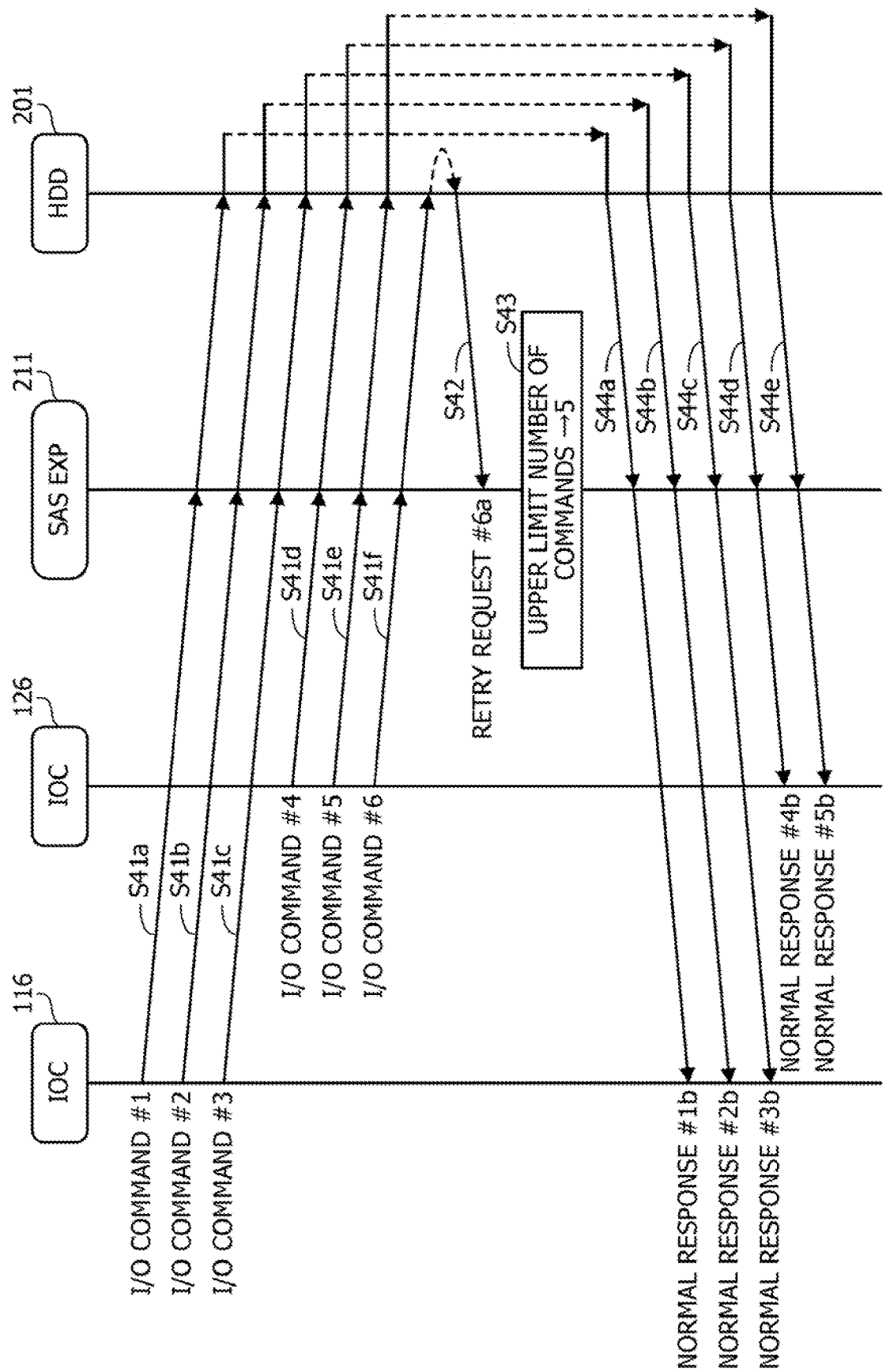
FIG. 10 is a sequence diagram illustrating a processing example when the upper limit number of commands is designated.

FIG. 10 is a sequence diagram illustrating a processing example when the upper limit number of commands is designated. As an example, FIG. 10 illustrates a case where the upper limit number of commands is designated in response to a retry request for the command transmission from the HDD.

In the example in FIG. 10, I/O commands #1 to #6 for the HDD 201 are transmitted in order (steps S41a to S41f). As an example, it is assumed that I/O commands #1 to #3 are transmitted from the IOC 116, and the I/O commands #4 to #6 are transmitted from the IOC 126. These I/O commands #1 to #6 are transmitted to the HDD 201 via the SAS expander 211.

Here, it is assumed that the number of entries of the command queue included in the HDD 201 is "5". In the HDD 201, the received I/O commands #1 to #5 are separately registered in the entries of the command queue, and the processing according to the command contents is executed.

However, when the I/O command #6 is received in a state in which the execution of the processing according to each of the I/O commands #1 to #5 is not completed, the HDD 201 is not able to process this I/O command #6 and therefore, returns a retry request #6a for the command transmission (step S42).

The SAS expander 211 receives the retry request #6a from the HDD 201. At this time, since the I/O commands #1 to #6 have been registered in the command management table 251 of the SAS expander 211 in association with the port connected to the HDD 201, the number of incomplete commands corresponding to the HDD 201 is "6". The SAS expander 211 designates "5", which is obtained by subtracting "1" from the number of incomplete commands "6", as the upper limit number of commands corresponding to the HDD 201 and sets "5" in the command management table 251, as the upper limit number of commands associated with the port connected to the HDD 201 (step S43).

In this step S43, it is estimated that, among the incomplete commands, the other five incomplete commands except for the incomplete command corresponding to the retry request #6a have been registered in the command queue of the HDD 201, and the incomplete command corresponding to the retry request #6a has overflowed from the command queue. Therefore, the number of entries of the command queue included in the HDD 201 is estimated to be "5", and "5" is set as the upper limit number of commands corresponding to the HDD 201.

Note that, in the HDD 201, when the I/O processing corresponding to each of the I/O commands #1 to #5 is executed, normal responses #1*b* to #5*b* corresponding to the I/O commands #1 to #5, respectively, are returned (steps S44*a* to S44*e*). The normal responses #1*b* to #3*b* are transferred to the IOC 116 from the SAS expander 211, and the normal responses #4*b* and #5*b* are transferred to the IOC 126 from the SAS expander 211.

Figure 11:
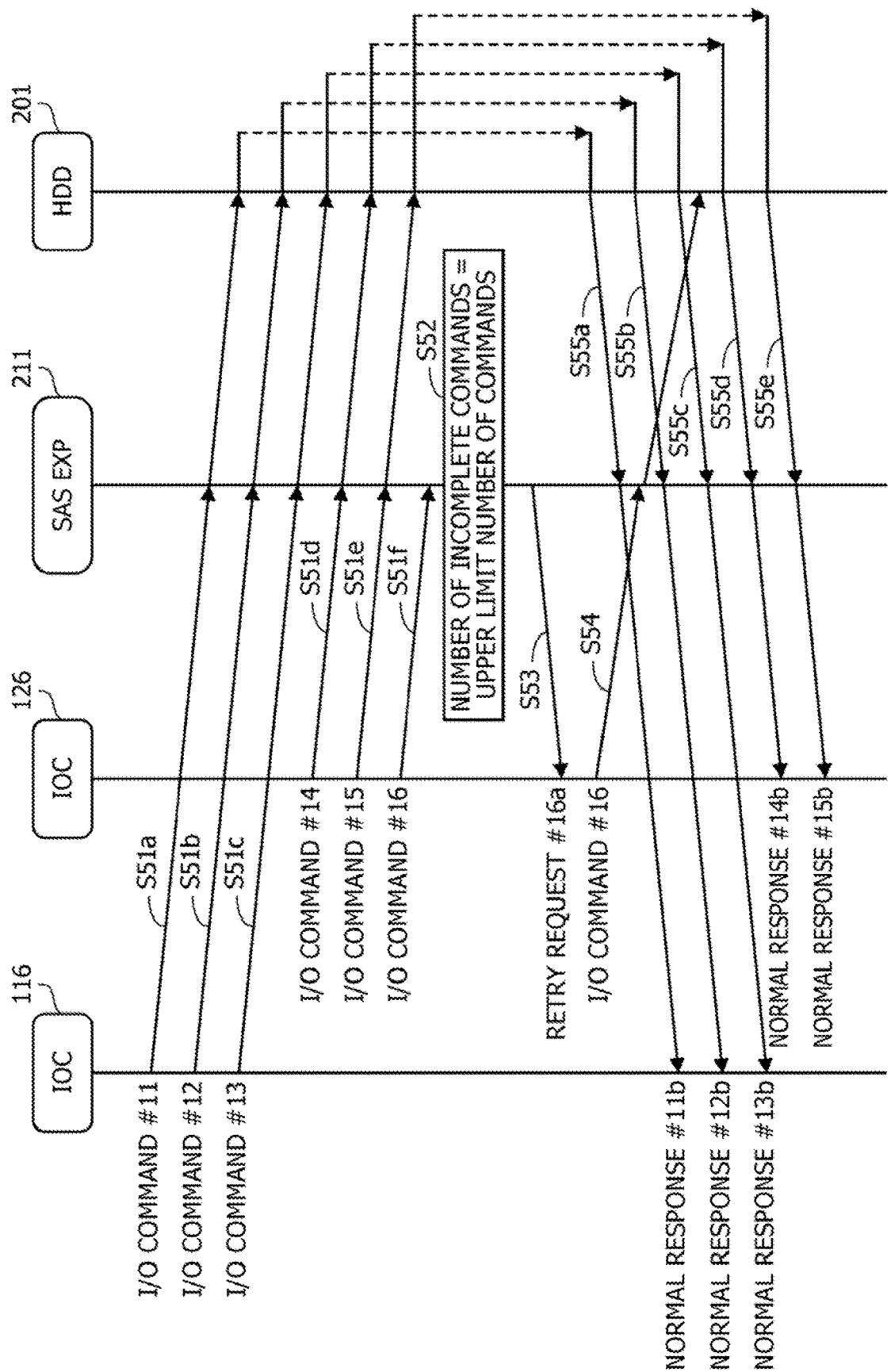
FIG. 11 is a sequence diagram illustrating a processing example when the transmission of an I/O command is restricted based on the upper limit number of commands.

FIG. 11 is a sequence diagram illustrating a processing example when the transmission of an I/O command is restricted based on the upper limit number of commands. In the initial state of FIG. 11, it is assumed that "5" is set as the upper limit number of commands corresponding to the HDD 201 by the process illustrated in FIG. 10. In addition, for the sake of simplicity of the explanation, it is assumed that no incomplete command for the HDD 201 is registered in the command management table 251 in the initial state of FIG. 11.

In the example in FIG. 11, I/O commands #11 to #16 for the HDD 201 are transmitted in order (steps S51*a* to S51*f*). As an example, it is assumed that I/O commands #11 to #13 are transmitted from the IOC 116, and the I/O commands #14 to #16 are transmitted from the IOC 126. These I/O commands #11 to #16 are transmitted to the HDD 201 via the SAS expander 211.

Here, when the SAS expander 211 receives each of the I/O commands #11 to #15 (before transferring to the HDD 201), the number of incomplete commands corresponding to the HDD 201 registered in the command management table 251 is smaller than the upper limit number of commands "5". However, at the time point of receiving the I/O command #16, the SAS expander 211 determines that the number of incomplete commands corresponding to the HDD 201 matches the upper limit number of commands "5" (step S52). In this case, the SAS expander 211 discards the received I/O command #16 and returns, to the IOC 126, a retry request #16*a* requesting to retry the transmission of the I/O command #16 (step S53).

This avoids the occurrence of a situation in which a number of I/O commands exceeding the number of entries of the command queue included in the HDD 201 are transmitted to the HDD 201. Therefore, the HDD 201 is less likely to transmit a retry request for an I/O command that has overflowed from the command queue, and for example, frequent transmission of such a retry request is also less likely to cause unstable behavior of the entire system. As a result, the possibility that the I/O performance of the entire system will deteriorate may be suppressed.

Upon receiving the retry request #16*a*, the IOC 126 transmits the I/O command #16 again (step S54). Meanwhile, in the HDD 201, the I/O processing corresponding to each of the I/O commands #11 to #15 is executed, and normal responses #11*b* to #15*b* corresponding to the I/O commands #11 to #15, respectively, are returned (steps S55*a* to S55*e*). The normal responses #11*b* to #13*b* are transferred to the IOC 116 from the SAS expander 211, and the normal responses #14*b* and #15*b* are transferred to the IOC 126 from the SAS expander 211.

Here, it is assumed that the SAS expander 211 receives the I/O command #16 resent from the IOC 126, for example, at the timing immediately after the normal response #11*b* is transferred to the IOC 116. At this time, the number of incomplete commands corresponding to the HDD 201 is "4", which is lower than the upper limit number of commands "5". Therefore, the SAS expander 211 transfers the received I/O command #16 to the HDD 201.

In this manner, an I/O command restricted from being transferred to the HDD by the SAS expander 211 is resent from the IOC in response to the retry request from the SAS expander 211. At this time, since the response to an I/O command that has been transferred to the HDD is likely to have been completed, the resent I/O command is highly likely to be transferred to the HDD.

Here, in a case where the I/O commands are likely to overflow from the command queue of the HDD, since a smaller number of devices and circuits on the route are involved in being requested to retry by the SAS expander 211 than being requested to retry the command transmission by the HDD 201, the delay in transmission timing is highly likely to be smaller. Therefore, the I/O performance of the entire system may be improved.

In the storage system described above, the I/O commands are no longer simultaneously transmitted to the storage device accessed from the IOC, in excess of the number of entries of the command queue included in the storage device, and the storage device is enabled to demonstrate highest possible I/O performance. Meanwhile, from the perspective of the IOC, while being allowed to simultaneously transmit as many I/O commands as possible according to the own performance of the IOC, transmission of surplus I/O commands that the storage device is actually not able to process is restricted by the SAS expander.

As a result, as many I/O commands as possible are allowed to be simultaneously transmitted to the storage device within a range in which the I/O commands does not overflow from the command queue of the storage device, and the I/O performance of the entire system may be maintained properly. For example, when the maximum performance of the IOC is lower than the maximum performance of the storage device, the possibility that the I/O performance of the entire system will become lower than the maximum performance of the storage device may be suppressed.

Note that, in the second embodiment described above, the processing functions of the command processing unit 241 and the timer 242 illustrated in FIG. 5 are equipped in the SAS expanders 211 and 212. However, these processing functions may also be equipped in the SAS expanders 117 and 127 instead of the SAS expanders 211 and 212, for example. In this case, the command management tables 251 of the SAS expanders 117 and 127 only have to manage the I/O commands, the elapsed time, and the upper limit number of commands not for each port connected to the HDD, but for each HDD that is the transmission destination of the I/O command.

In addition, the processing functions of the devices described in each of the above embodiments (for example, the control devices 1 to 3, the data relay device 20, the CMs 110 and 120, the host device 300) may be implemented by a computer. In that case, a program describing the processing contents of the functions that each device is supposed to have is provided, and the above processing functions are implemented on the computer by the execution of the program on the computer. The program describing the processing contents may be recorded on a computer-readable recording medium. The computer-readable recording medium includes a magnetic storage device, an optical disc, a semiconductor memory, and the like. The magnetic storage device includes a hard disk drive (HDD), a magnetic tape, and the like. The optical disc includes a compact disc (CD), a digital versatile disc (DVD), a Blu-ray disc (BD, registered trademark), and the like.

In a case where the program is to be distributed, for example, portable recording media such as DVDs and CDs in which the program is recorded are sold. Furthermore, it is also possible to store the program in a storage device of a server computer and transfer the program from the server computer to another computer via a network.

The computer that executes the program stores, for example, the program recorded on the portable recording medium or the program transferred from the server computer in its own storage device. Then, the computer reads the program from its own storage device and executes processing according to the program. Note that the computer may also read the program directly from the portable recording medium and execute processing according to the program. Furthermore, the computer may also sequentially execute processing according to the received program each time when the program is transferred from the server computer connected via the network.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data relay device comprising:
a storage circuit configured to store, for each of a plurality of storage devices, an upper limit number that indicates a number of input/output (I/O) commands that are transmittable;
a relay circuit configured to relay data transmitted and received between one or more control devices and the plurality of storage devices; and
a control circuit configured to perform processing, the processing including:
counting, for each of the plurality of storage devices, a number of commands that indicates a number of the I/O commands that have been transmitted from any of the one or more control devices to any of the plurality of storage devices via the relay circuit and for which no response has been returned from transmission destination storage devices among the plurality of storage devices;
in response to a request to retry transmission of the I/O commands from one storage device among the plurality of storage devices, registering a first number in the storage circuit as the upper limit number of commands that corresponds to the one storage device, the first number being a number obtained by subtracting one from a counted value of the number of commands that corresponds to the one storage device; and
in response that the relay circuit receives the I/O commands for the one storage device from one control device among the one or more control devices,
determining whether the counted value of the number of commands that corresponds to the one storage device immediately before the reception of the I/O commands has reached the upper limit number of commands that corresponds to the one storage device, and
in a case where the counted value of the number of commands that corresponds to the one storage device immediately before the reception of the I/O commands has reached the upper limit number of commands that corresponds to the one storage device, discarding the received I/O commands and requests the one control device to retry transmission of the received I/O command.

2. The data relay device according to claim 1, wherein
the control circuit further registers the number obtained by subtracting one from the counted value of the number of commands that corresponds to the one storage device, in the storage circuit as the upper limit number of commands that corresponds to the one storage device, also when an elapsed time since transmission reaches a predetermined threshold value for any of the I/O commands transmitted to the one storage device.

3. The data relay device according to claim 1, wherein
the control circuit further registers the number obtained by subtracting one from the counted value of the number of commands that corresponds to the one storage device, in the storage circuit as the upper limit number of commands that corresponds to the one storage device, when receiving a retry command that corresponds to any of the I/O commands transmitted to the one storage device from any of the one or more control devices.

4. A data relay method implemented by a data relay device of relaying data transmitted and received between one or more control devices and a plurality of storage devices, the method comprising:
counting, for each of the plurality of storage devices, a number of commands that indicates a number of input/output (I/O) commands that have been transmitted from any of the one or more control devices to any of the plurality of storage devices via the data relay device and for which no response has been returned from transmission destination storage devices among the plurality of storage devices;
in response to a request to retry transmission of the I/O commands from one storage device among the plurality of storage devices, registering a first number in a storage circuit of the data relay device as an upper limit number of commands that corresponds to the one storage device, the first number being a number obtained by subtracting one from a counted value of the number of commands that corresponds to the one storage device; and
in response that the relay circuit receives the I/O commands for the one storage device from one control device among the one or more control devices,
determining whether the counted value of the number of commands that corresponds to the one storage device immediately before the reception of the I/O commands has reached the upper limit number of commands that corresponds to the one storage device, and
in a case where the counted value of the number of commands that corresponds to the one storage device immediately before the reception of the I/O commands has reached the upper limit number of commands that corresponds to the one storage device, discarding the received I/O commands and requests the one control device to retry transmission of the received I/O command.

5. A storage system comprising:
one or more control devices;
a plurality of storage devices; and
a data relay device comprising:
a storage circuit configured to store, for each of the plurality of storage devices, an upper limit number that indicates a number of input/output (I/O) commands that are transmittable;
a relay circuit configured to relay data transmitted and received between the one or more control devices and the plurality of storage devices; and
a control circuit configured to perform processing, the processing including:
counting, for each of the plurality of storage devices, a number of commands that indicates a number of the I/O commands that have been transmitted from any of the one or more control devices to any of the plurality of storage devices via the relay circuit and for which no response has been returned from transmission destination storage devices among the plurality of storage devices;
in response to a request to retry transmission of the I/O commands from one storage device among the plurality of storage devices, registering a first number in the storage circuit as the upper limit number of commands that corresponds to the one storage device, the first number being a number obtained by subtracting one from a counted value of the number of commands that corresponds to the one storage device; and
in response that the relay circuit receives the I/O commands for the one storage device from one control device among the one or more control devices,
determining whether the counted value of the number of commands that corresponds to the one storage device immediately before the reception of the I/O commands has reached the upper limit number of commands that corresponds to the one storage device, and
in a case where the counted value of the number of commands that corresponds to the one storage device immediately before the reception of the I/O commands has reached the upper limit number of commands that corresponds to the one storage device, discarding the received I/O commands and requests the one control device to retry transmission of the received I/O command.

* * * * *